US006267940B1

(12) United States Patent
Chang et al.

(10) Patent No.: US 6,267,940 B1
(45) Date of Patent: Jul. 31, 2001

(54) METHOD FOR REDUCING $NO_X$ WITH AN ACTIVATED CATALYST

(75) Inventors: Ramsay Chang, Los Altos, CA (US); Sharon Sjostrom, Denver, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/371,256

(22) Filed: Aug. 10, 1999

(51) Int. Cl.⁷ .............................. C01B 8/00; B01J 37/34
(52) U.S. Cl. ..................... 423/239.1; 502/5; 502/522
(58) Field of Search ..................... 423/239.1; 502/5, 502/522

(56) References Cited

U.S. PATENT DOCUMENTS 6,153,159 * 11/2000 Engeler et al. ................ 423/213.2

FOREIGN PATENT DOCUMENTS

1212179A * 3/1999 (CN) .

* cited by examiner

Primary Examiner—Steven P. Griffin
Assistant Examiner—Maribel Medina
(74) Attorney, Agent, or Firm—Pennie & Edmonds LLP

(57) ABSTRACT

A method of reducing $NO_X$ within a gas stream includes the step of placing a $NO_X$ reducing catalyst within a flue gas stream. The $NO_X$ reducing catalyst activity is enhanced by applying a separate activating source that significantly improves removal of $NO_X$ from the flue gas stream. The $NO_X$ reducing catalyst may be a stationary $NO_X$ reducing catalyst structure positioned in the flue gas stream. Alternately, the $NO_X$ reducing catalyst may be injected into the flue gas stream as a $NO_X$ reducing catalyst powder. The $NO_X$ reducing catalyst powder may be subsequently gathered in a particulate collection device. The $NO_X$ reducing catalyst may be further activated in the particulate collection device. The operation of separately activating the $NO_X$ reducing catalyst may be implemented by applying electromagnetic energy to the $NO_X$ reducing catalyst, by applying an electric field to the $NO_X$ reducing catalyst, by applying electric current through the $NO_X$ reducing catalyst, or by applying a magnetic field to the $NO_X$ reducing catalyst.

23 Claims, 3 Drawing Sheets

METHOD FOR REDUCING NO$_X$ WITH AN ACTIVATED CATALYST

BRIEF DESCRIPTION OF THE INVENTION

This invention relates generally to the control of pollutants from combustion processes. More particularly, this invention relates to a technique for enhancing NO$_X$ reducing catalyst activity and thereby efficiently removing NO$_X$ from a combustion process gas stream.

BACKGROUND OF THE INVENTION

The 1990 Clean Air Act Amendments require major sources of air emissions to limit the discharge of NO$_X$. NO$_X$ is present in the flue gas emitted from combustion processes. Therefore, cost-effective methods for controlling NO$_X$ are of significant interest.

Selective Catalytic Reduction (SCR) catalysts for NO$_X$ removal are known in the art. Conventional NO$_X$ SCR catalysts require large amounts of catalyst and the flue gas stream to be at relatively high temperatures (between approximately 300 to 400° C.) in order to have sufficient activity for effective NO$_X$ reduction. In such schemes, ammonia is also added as a reducing agent.

There are ongoing efforts to develop low temperature catalysts for applications between approximately 100 to 250° C. Unfortunately, these low temperature catalysts are sensitive to high SO$_X$, concentrations in the flue gas. There are also NO$_X$ SCR catalysts being developed that are reagentless, so, for instance, ammonia is not required as a reducing agent. These catalyst systems can benefit from the imposition of additional and alternative activating agents to the catalyst so that they can operate at lower temperatures, be less sensitive to poisoning agents, and more reactive without the addition of chemical agents.

In view of the foregoing, it would be highly desirable to provide an approach to enhance NO$_X$ removal. Ideally, the technique would reduce the amount of catalyst needed, or would operate at relatively low temperatures, or reduce the amount of required chemical reducing agents.

SUMMARY OF THE INVENTION

A method of reducing NO$_X$ within a gas stream includes the step of placing a NO$_X$ reducing catalyst within a flue gas stream that is further activated to enhance NO$_X$ reduction in the flue gas stream. The NO$_X$ reducing catalyst may be a stationary NO$_X$ reducing catalyst structure positioned in the flue gas stream. Alternately, the NO$_X$ reducing catalyst may be injected into the flue gas stream as a NO$_X$ reducing catalyst powder. The NO$_X$ reducing catalyst powder may be subsequently gathered in a particulate collection device. The NO$_X$ reducing catalyst may be further activated in the particulate collection device. The operation of enhancing the activity of the NO$_X$ reducing catalyst may be implemented by applying electromagnetic energy to the NO$_X$ reducing catalyst, by applying an electric field to the NO$_X$ reducing catalyst, by applying electric current through the NO$_X$ reducing catalyst, or by applying a magnetic field to the NO$_X$ reducing catalyst.

The invention provides a technique for promoting catalytic activity in various NO$_X$ SCR catalysts so that the catalysts can be operated and installed under conditions where they are less active and therefore otherwise not effective for NO$_X$ reduction in gases. The invention facilitates the use of catalysts at lower temperatures. The invention renders the catalysts less sensitive to poisoning agents, and otherwise more reactive, even without the addition of chemical agents. The enhanced catalytic activity reduces the amount and size of the catalyst needed to reduce NO$_X$ effectively. The NO$_X$ reduction technique of the invention is cost-effective, thereby minimizing the overall cost of generating electricity in fossil-fired power plants.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
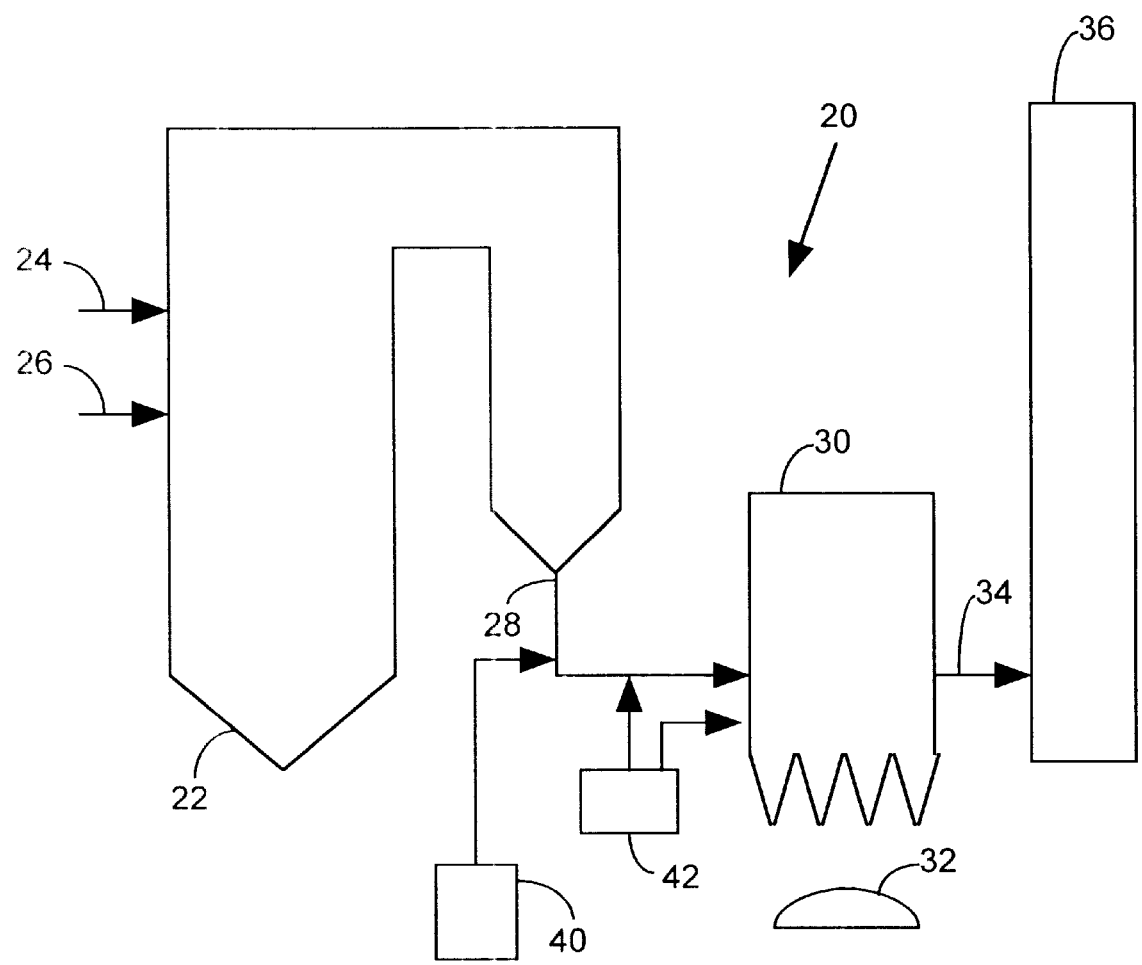
FIG. 1 illustrates a NO$_X$ reduction apparatus constructed in accordance with a first embodiment of the invention.

FIG. 1 illustrates a pollution removal system 20 for use with a combustion source, such as a fossil-fuel-fired boiler 22, which receives air through an air inlet duct 24 to combust fuel, such as coal received through a fuel inlet duct 26. The combustion process within the boiler 22 produces a gas stream in the form of flue gas which exits the boiler 22 through an outlet duct 28. The flue gas produced within the boiler 22 is comprised of air, products of combustion in the gaseous form, such as water vapor, carbon dioxide, oxides of nitrogen and sulfur, halides, organic compounds, mercury, selenium and other trace metal vapors and particulate matter. A particulate collection device 30 is connected to the outlet duct 28 and removes particulate matter 32 from the flue gas. The particulate collection device outlet duct 34 directs the flue gas to the stack 36 where it is discharged.

The power plant components discussed up to this point are conventional. The invention is directed toward supplementing the operation of these components to include a process wherein a NO$_X$ reducing catalyst is used to remove NO$_X$ from flue gas in the outlet duct 28. The invention utilizes a NO$_X$ reducing catalyst injector 40 to inject a NO$_X$ reducing catalyst powder into the outlet duct 28. A separate activation source 42 is used to activate the NO$_X$ reducing catalyst while it is in the output duct 28 and/or in the particulate collection device 30.

The combination of the catalyst injection 40 and activation source 42 enhance the activity of the NO$_X$ reducing catalyst and enable significant NO$_X$ reduction in the duct 28 and the particulate collection device 30. The invention also allows a NO$_X$ reducing catalyst to be used at relatively low temperatures, e.g., between approximately 100 to 250° C.

The NO$_X$ reducing catalyst injector 40 may be implemented as any standard particle injector. The activation source 42 is implemented as an energy producing mechanism. The energy created by the energy producing mechanism activates the NO$_X$ reducing catalyst. The energy producing mechanism may be implemented to create an electrical field across the catalyst surface. The catalyst structure may also be irradiated with electromagnetic energy, such as microwave radiation, ultraviolet radiation, or infrared radiation. The activation source 42 may also be implemented to produce a magnetic field.

Those skilled in the art will appreciate that the foregoing activation techniques may be used alone or in combination.

The underlying principle of the activation technique is to render the $NO_X$ reducing catalyst sufficiently active through supplemental and alternative energy input and excitation energies so that lower amounts of catalyst are needed or the catalyst can operate in a relatively low temperature (between approximately 100 to 250° C.) flue gas stream.

In one embodiment of the invention, the catalyst injector 40 injects a fine $NO_X$ catalyst powder into the duct 44 and the output duct 28. The catalyst powder is irradiated by electromagnetic waves produced by the activation source 42. This irradiation may occur in the duct 44 and/or the output duct 28. The fine catalyst powder is then captured in the downstream particle collection device 30, which may be a baghouse or electrostatic precipitator, where the powder may be further irradiated with electromagnetic waves to continue the reaction with $NO_X$. In this embodiment, the $NO_X$ in the gas stream reacts with the catalyst suspended in the gas stream as well as when the catalyst is deposited on the surface of the filter bags or precipitator.

Figure 2:
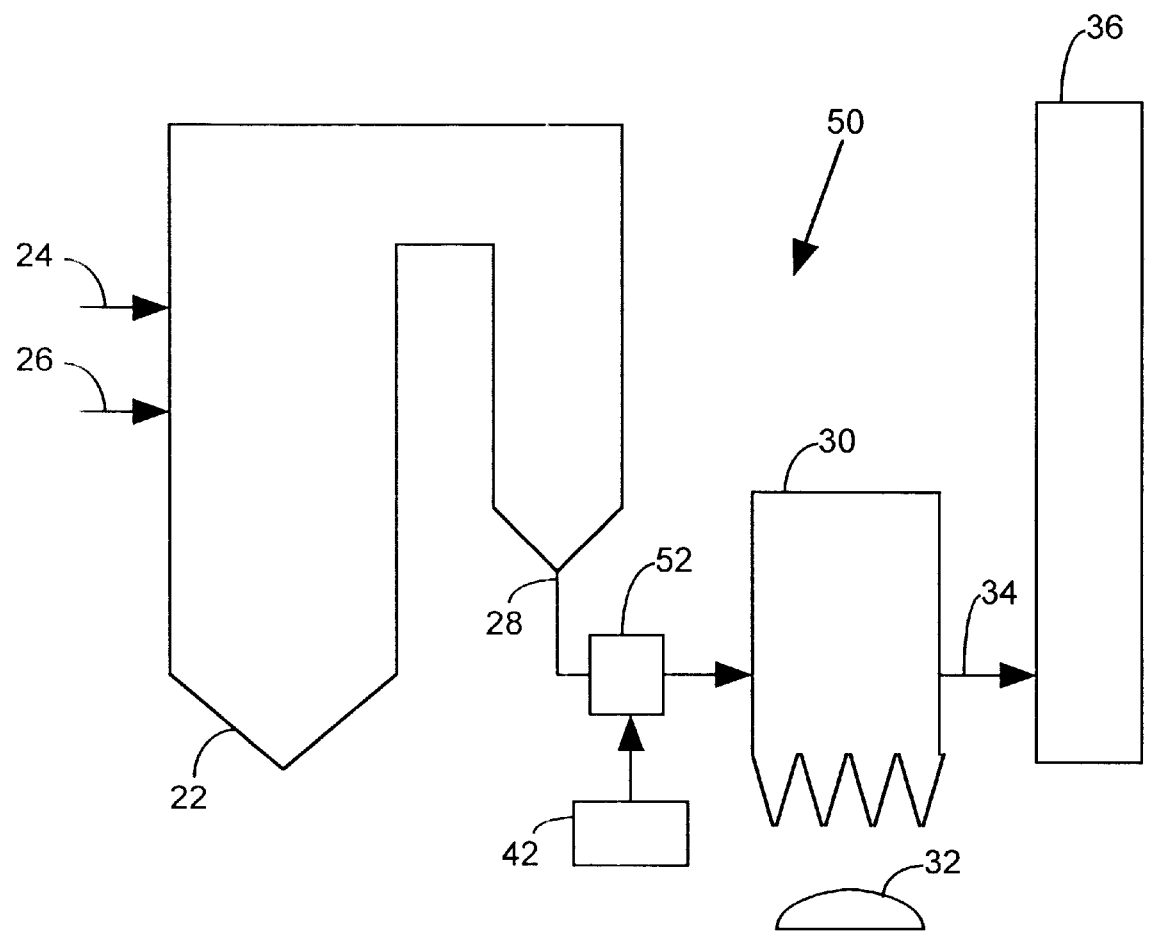
FIG. 2 illustrates a NO$_X$ reduction apparatus constructed in accordance with a second embodiment of the invention.

FIG. 2 illustrates an alternate embodiment of the invention. The apparatus 50 of FIG. 2 corresponds to the apparatus of FIG. 1, except in FIG. 2, a catalyst injector is not used. Instead, a $NO_X$ reducing catalyst structure 52 is placed in the output duct 28. The structure 52 is activated by the activation source 42. The structure 52 may be implemented as a honeycomb-shaped structure or as a set of parallel plates. $NO_X$ in the gas stream is reduced to harmless nitrogen (with or without added reagents, such as ammonia, methane, or hydrogen) as the gas stream passes over the catalyst structure.

Figure 3:
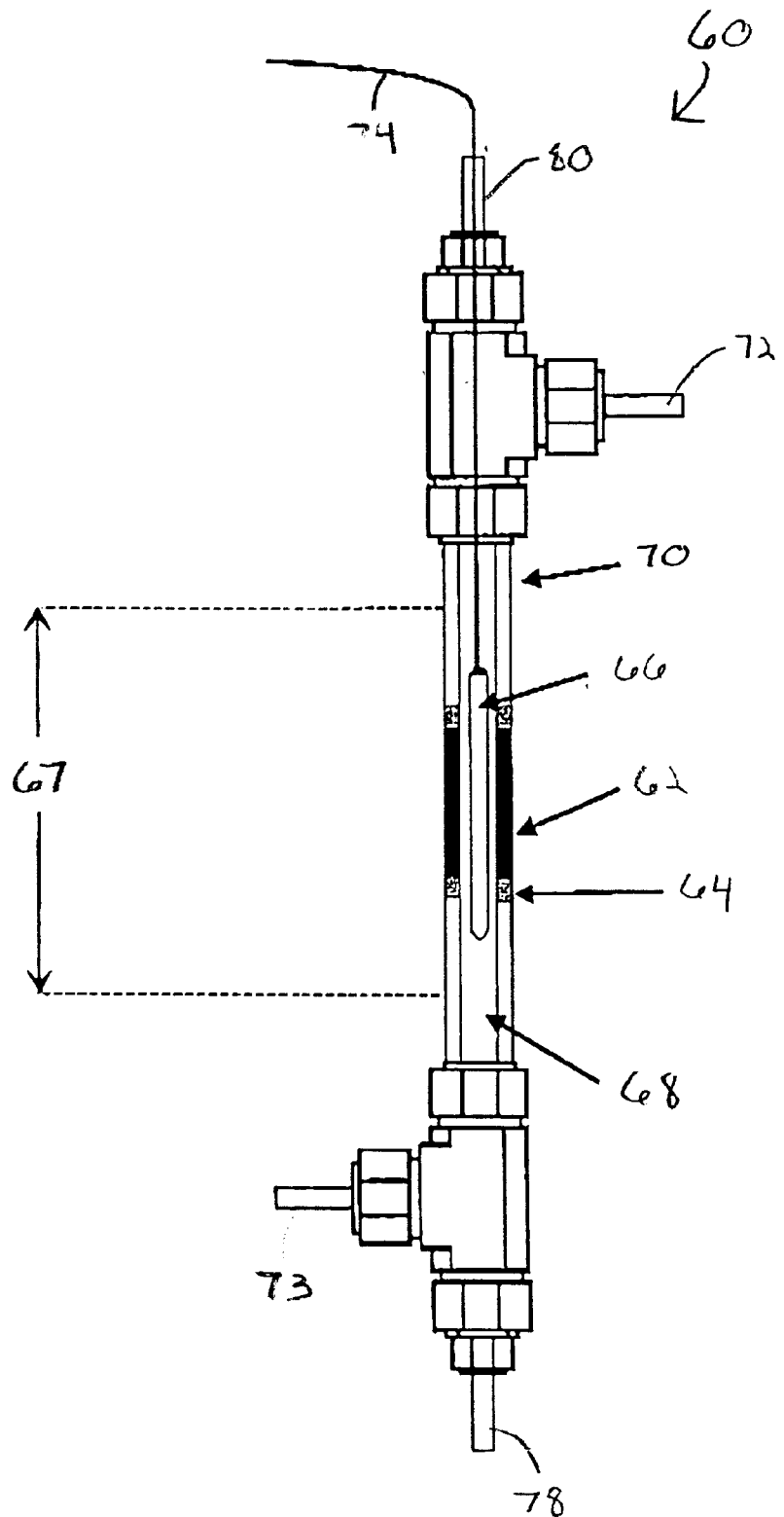
FIG. 3 illustrates a testing apparatus used to establish the efficacy of the technique of the invention.

FIG. 3 illustrates a test apparatus 60 used to substantiate the effectiveness of he invention. The test apparatus 60 includes a catalyst 62 positioned between quartz wool barriers 64. An ultraviolet light source 66 is used to irradiate the catalyst 62 in a heating zone 67.

The test apparatus 60 further includes an inner quartz tube 68 and an outer pyrex tube 70. A input port 72 receives a controlled flow of gas, which is discharged at output port 73. A wire 74 delivers power to the ultra violet light source 66. An air input port 78 receives pumped air, which is discharged at an air output port 80.

In one embodiment, the catalyst 62 was prepared by the decomposition of metal nitrates (Catalyst I) or other water soluble species on a support. An aqueous solution containing amounts of metal nitrates in concentration ratios appropriate to obtain a desired catalyst stoichiometry was used. The solution was added drop-wise to a support (silica gel, large pore, −8 mesh, 300 m²/g) until excess of the liquid just appeared (incipient wetness impregnation). In the case of a $V_2O_5$—$TiO_2$SCR catalyst (Catalyst II), ammonium meta-vanadate ($NH_4VO_3$) was used as the vanadium oxide source.

The reactor employed in evaluating these systems is shown in FIG. 3. The following points are noteworthy: 1) products were monitored with electrochemical $NO_X$ sensors; 2) the flow rates of the gases He, NO, and $O_2$ through ports 72 and 73 were controlled with precision metering valves and measured with flow meters; 3) the reactor consisted of a straight quartz tube 68 with a 12 mm outside diameter, which housed the UV source 66 and an outer Pyrex tube 70 of inside diameter 15.8 mm in between which the catalyst 62 was packed between two pieces of quartz wool 64; and 4) the reactor was heated using a temperature controlled furnace. The catalyst 62 was a powder of weight 1.1 5 g and a volume of 2.0 cm³. Space velocities reported here were based on the reactor volume occupied by the catalyst 62. A description of the analysis techniques that were utilized is presented in the following paragraphs.

$NO_X$ sensors (not shown) were used in connection with the apparatus of FIG. 3. Both NO and $NO_2$ were measured electrochemically using conventional sensors. The sensors were operated in parallel using Helium (He) as a carrier gas. The He flow was adjusted by a needle valve to approximately 10 mL/min. Samples were introduced with a syringe through injection ports located in the gas stream immediately before each sensor. The gas flow lines through the sensors were made of polytetrafluroethylene to reduce surface adsorption of $NO_2$.

Gas chromatography (GC) was used to quantify the products of NO decomposition (nitrogen and nitrous oxide). An HP 5890 Series II gas chromatograph equipped with a thermal conductivity detector (TCD) and a CTR I column operating at a temperature of 30° C. and using a helium carrier gas was used. A sampling value equipped with a 2 ml sample loop was employed.

Activity data obtained for catalysts evaluated at 350° C. are summarized in Table 1.

TABLE 1

Data for UV Activation of $NO_X$ Reducing Catalysts. T = 100° C. λ = 254 nm.

| CATALYST | UV Activation | ppm NO & $NO_2$ | % O2 | Reducing Agent | % NO & $NO_2$ Removed | ppm $NO_2$ Produced | Space Velocity ($hr^{-1}$) |
|---|---|---|---|---|---|---|---|
| | Off | 665 | 0 | 0 | 0.6 | 0.0 | 432 |
| | On | 738 | 0 | 0 | 28.7 | 32 | 432 |
| | Off | 596 | 1.42 | 0 | −2.9 | 30 | 522 |
| Catalyst I | On | 576 | 1.42 | 0 | −6.2 | 233 | 522 |
| (11.1 wt. % | Off | 554 | 0 | 0 | 6 | −1 | 4340 |
| $Sr_2 Bi_2Cu_2O_7$/silica gel) | On | 527 | 0 | 0 | 6.7 | 15 | 4340 |
| | Off | 593 | 0 | 0 | 5.6 | 0 | 5296 |
| | On | 558 | 0 | 0 | 11.1 | 22 | 5296 |
| | Off | 674 | 2.67 | 0 | 2.5 | 3 | 5147 |
| | On | 678 | 2.67 | 0 | 4.1 | 71 | 5147 |
| | Off | 3 | 0 | 0 | 50.0 | 0 | 580 |
| | Off | 2 | 0 | 0 | −50.0 | 2 | 580 |
| | Off | 2 | 2.50 | 0 | 0.0 | 0 | 536 |
| | On | 3 | 2.50 | 0 | −33.9 | 2 | 536 |
| | Off | 544 | 0.0 | 351 ppm CO | 3.1 | 2 | 1077 |
| | On | 509 | 0.0 | 351 ppm | 1.8 | 58 | 1077 |

TABLE 1-continued

Data for UV Activation of $NO_x$ Reducing Catalysts. T = 100° C. λ = 254 nm.

| CATALYST | UV Activation | ppm NO & $NO_2$ | % O2 | Reducing Agent | % NO & $NO_2$ Removed | ppm $NO_2$ Produced | Space Velocity ($hr^{-1}$) |
|---|---|---|---|---|---|---|---|
| | Off | 811 | 2.50 | 373 ppm CO | −2.8 | 31 | 1012 |
| | On | 813 | 2.50 | 373 ppm CO | −6.6 | 233 | 1012 |
| | Off | 823 | 3.01 | 941 ppm CO | 0.0 | 33 | 1037 |
| | On | 767 | 3.01 | 941 ppm CO | −11.0 | 239 | 1037 |
| | Off | 641 | 2.68 | 509 ppm $NH_3$ | 5.9 | 3 | 945 |
| | On | 636 | 2.68 | 509 ppm $NH_3$ | 38.4 | 51 | 945 |
| | Off | 430 | 1.79 | 574 ppm | 0.0 | 0 | 1416 |
| | On | 439 | 1.79 | 574 ppm | 37.7 | 36 | 1416 |
| Catalyst II | Off | 550 | 0.0 | 0 | 1.6 | −2 | 430 |
| 1.2% $V_2O_5$ on $TiO_2$ | On | 509 | 0.0 | 0 | 8.1 | 0 | 494 |
| | Off | 491 | 2.57 | 0 | −5.6 | 10 | 589 |
| | On | 516 | 2.57 | 0 | 8.9 | 6 | 589 |
| | Off | 460 | 2.57 | 0 | 0.4 | −1 | 959 |
| | Off | 468 | 0.0 | 0 | 5.7 | 2 | 976 |
| | Off | 445 | 1.83 | 0 | 8.2 | 4 | 976 |
| | Off | 636 | 2.38 | 444 ppm $NH_3$ | 5.9 | −2 | 867 |
| | On | 612 | 2.38 | 444 ppm $NH_3$ | 38.7 | −4 | 867 |
| | Off | 444 | 1.26 | 742 ppm $NH_3$ | 0.0 | 0 | 1635 |
| | Off | 453 | 0 | 0 | 0.0 | 0 | 4938 |
| | On | 526 | 0 | 0 | 6.7 | −1 | 4938 |
| | On | 552 | 2.95 | 0 | 0.0 | 7 | 5137 |
| | On | 559 | 2.95 | 0 | 8.0 | 4 | 5137 |
| | Off | 633 | 4.92 | 496 ppm $NH_3$ | 8.8 | 2 | 1021 |
| | On | 573 | 4.92 | 41.4 $NH_3$ | −9 | 1021 | |
| | Off | 588 | 2.11 | 488 ppm $NH_3$ | 14.5 | −4 | 849 |
| | On | 656 | 2.11 | 488 ppm $NH_3$ | 62.2 | 20 | 849 |

Several general observations are apparent from the above table. First, appreciable differences in activity were observed when the UV source was in the "On" versus the "Off" state. Two, in the absence of oxygen, a net removal of nitrogen oxides ($NO+NO_2$) via UV activation was observed over a space velocity range of 400 –5300 $h^{-1}$. Three, Catalyst II exhibited less $NO_2$ production than Catalyst I when $O_2$ was introduced. Four, apparently negative conversions resulted from the storage of $NO_2$ in the catalyst. Finally, activity was still evident after over 1000 hours on-line.

Some discussion of the nature of the UV activation process follows. Reagentless reactions are considered first. The observations concerning reagentless reactions absent added oxygen are as follows: 1) $NO_2$ was not produced in great abundance and 2) the order of activity was $Sr_2Bi_2Cu_2O_7$/silica gel>$V_2O_5$/$TiO_2$. Introducing 1–3% $O_2$ gave the result that the net conversion of $NO+NO_2$ displayed the order $V_2O_5$/$TiO_2$>$Sr_2Bi_2Cu_2O_7$/silica gel. In the case of Catalyst I, $NO_2$ was produced extensively. CO was found to be an ineffective reagent. In the case of both $V_2O_5$/$TiO_2$ and $Sr_2Bi_2Cu_2O_7$/silica gel, it was found that ammonia was an effective reagent for the UV activation of nitrogen oxides. In the case of $V_2O_5$/$TiO_2$, the disappearance of nitrogen oxides was fully accounted for in terms of the products of ammonia reduction. The product distribution was $N_2$(95%) and $N_2O$ (5%). It is not likely that scissioning of the N—O bond by direct interaction with the radiation occurs since the difference in energies between LUMO (Lowest Unoccupied Molecular Orbital) and HOMO (Highest Occupied Molecular Orbital) was less than the source energy (4.0 eV) of the 254 nm UV lamp. Rather, substrate excitation or excitation of a substrate-NO complex must occur. Decomposition in the absence of oxygen occurs according to the following mechanism:

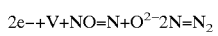

In the case of oxidation, UV radiation probably serves to excite hole states, leading to the following important steps:

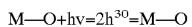

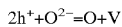

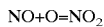

In the case of the silica supported catalysts, the ammonia reagent probably works by its reaction with $NO_2$ formed by UV excitation, since the dioxide species is formed over both of the catalysts in the presence of oxygen when the catalyst is irradiated with ultraviolet light. The mechanism in the case of $V_2O_5$/$TiO_2$ is clear, since UV does not cause $NO_2$ to be generated.

The foregoing results demonstrate conversion via a nonoxidative pathway has been obtained using ultraviolet activation of nitrogen oxides. Although the conversion may be low relative to current $NO_X$ catalysts, it must be remembered that the catalysts employed here were not optimal: strongly basic catalysts are not expected to be effective at promoting SCR. For example, it is well known that bases including alkali and alkaline earths poison SCR catalysts. In contrast, catalysts found to display significant and even potentially useful activity absent reagents, demonstrated a preferred oxidative pathway under UV irradiation when oxygen was introduced into the system. This is in sharp distinction to the behavior exhibited by the catalysts in thermal catalytic activation of $NO_2$. In that case, the catalysts removed NO essentially completely through a nonoxidative pathway, with a nitrogen product.

In sum, the foregoing data demonstrates UV activation as a tool for the nonoxidative removal of NO from an exhaust stream containing up to 5% $O_2$. Reagentless decomposition was demonstrated in the absence of oxygen. However, there was a marked tendency for the reagentless catalysts to produce $NO_2$ in the presence of $O_2$. In the presence of oxygen, ammonia present in a 0.7 to 1.5:1 ratio with respect to $NO+NO_2$ resulted in the essentially complete reduction of NO. One of these basic catalysts were found to be more active than an SCR catalyst.

The foregoing results indicate that UV radiation is effective for the nonoxidative activation of nitrogen oxides at low temperature (e.g., 100° C.). In particular, the use of a reagent (ammonia) was found to be effective in the UV activation of $NO_X$. The results point to certain steps that can be taken to optimize performance of the process. For example, increasing wavelength may reduce the tendency to oxidize NO and allow for possible use in reagentless or reduced-reagent catalysis. Catalyst optimization may also be considered to improve performance with specific wavelengths or wavelength ranges. Catalyst distribution may also be considered to improve exposure to radiation.

Those skilled in the art will appreciate that the invention provides a technique for promoting catalytic activity in various $NO_X$ SCR catalysts so that they can be operated and installed under conditions where they would not normally be active and may therefore provide more cost-effective options for $NO_X$ reduction in gases. The invention facilitates the use of catalysts at lower temperatures. The invention renders the catalysts less sensitive to poisoning agents, and otherwise more reactive, even without the addition of chemical agents. The $NO_X$ reduction technique of the invention is cost-effective, thereby minimizing the overall cost of generating electricity in fossil-fired power plants.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of reducing $NO_X$ within a gas stream, said method comprising the steps of:

placing a $NO_X$ reducing catalyst within a flue gas stream, wherein said placing step includes the step of injecting a $NO_X$ reducing catalyst powder into said flue gas stream;

enhancing the catalyst activity of said $NO_X$ reducing catalyst using a separate catalyst activating source, said $NO_X$ reducing catalyst thereby facilitating removal of $NO_X$ from said flue gas stream;

collecting said $NO_X$ reducing catalyst powder in a particulate collection device; and activating said $NO_X$ reducing catalyst in said particulate collection device.

2. A method of reducing $NO_X$ within a gas stream, said method comprising the steps of:

placing a $NO_X$ reducing catalyst within a flue gas stream, wherein said placing step includes the step of injecting a $NO_X$ reducing catalyst powder into said flue gas stream;

enhancing the catalyst activity of said $NO_X$ reducing catalyst using a separate catalyst activating source, said $NO_X$ reducing catalyst thereby facilitating removal of $NO_X$ from said flue gas stream; wherein said enhancing step includes the step of applying microwave energy to said $NO_X$ reducing catalyst.

3. A method of reducing $NO_X$ within a gas stream, said method comprising the steps of:

injecting a $NO_X$ reducing catalyst powder into a flue gas stream;

enhancing the catalyst activity of said $NO_X$ reducing catalyst using a separate catalyst activating source, said $NO_X$ reducing catalyst thereby facilitating removal of $NO_X$ from said flue gas stream; wherein said enhancing step includes the step of applying ultraviolet energy to said $NO_X$ reducing catalyst;

collecting said $NO_X$ reducing catalyst powder in a particulate collection device; and activating said $NO_X$ reducing catalyst in said particulate collection device.

4. A method of reducing $NO_X$ within a gas stream, said method comprising the steps of:

placing a $NO_X$ reducing catalyst within a flue gas stream; and enhancing the catalyst activity of said $NO_X$ reducing catalyst using a separate catalyst activating source, said $NO_X$ reducing catalyst thereby facilitating removal of $NO_X$ from said flue gas stream;

wherein said enhancing step includes the step of applying infrared energy to said $NO_X$ reducing catalyst.

5. The method of claim 4 wherein said placing step includes the step of positioning a stationary $NO_X$ reducing catalyst structure into said flue gas stream.

6. The method of claim 4 wherein said placing step includes the step of injecting a $NO_X$ reducing catalyst powder into said flue gas stream.

7. The method of claim 6 further comprising the step of collecting said $NO_X$ reducing catalyst powder in a particulate collection device.

8. The method of claim 7 further comprising the step of activating said $NO_X$ reducing catalyst in said particulate collection device.

9. A method of reducing $NO_X$ within a gas stream, said method comprising the steps of:

placing a $NO_X$ reducing catalyst within a flue gas stream; and enhancing the catalyst activity of said $NO_X$ reducing catalyst using a separate catalyst activating source, said $NO_X$ reducing catalyst thereby facilitating removal of $NO_X$ from said flue gas stream;

wherein said enhancing step includes the step of applying an electric field to said $NO_X$ reducing catalyst.

10. The method of claim 9 wherein said placing step includes the step of positioning a stationary $NO_X$ reducing catalyst structure into said flue gas stream.

11. The method of claim 9 wherein said placing step includes the step of injecting a $NO_X$ reducing catalyst powder into said flue gas stream.

12. The method of claim 11 further comprising the step of collecting said $NO_X$ reducing catalyst powder in a particulate collection device.

13. The method of claim 12 further comprising the step of activating said $NO_X$ reducing catalyst in said particulate collection device.

14. A method of reducing $NO_X$ within a gas stream, said method comprising the steps of:

placing a $NO_X$ reducing catalyst within a flue gas stream; and enhancing the catalyst activity of said $NO_X$ reducing catalyst using a separate catalyst activating source, said $NO_X$ reducing catalyst thereby facilitating removal of $NO_X$ from said flue gas stream;

wherein said enhancing step includes the step of applying electric current through said $NO_X$ reducing catalyst.

15. The method of claim 14 wherein said placing step includes the step of positioning a stationary $NO_X$ reducing catalyst structure into said flue gas stream.

16. The method of claim 14 wherein said placing step includes the step of injecting a $NO_X$ reducing catalyst powder into said flue gas stream.

17. The method of claim 16 further comprising the step of collecting said $NO_X$ reducing catalyst powder in a particulate collection device.

18. The method of claim 17 further comprising the step of activating said $NO_X$ reducing catalyst in said particulate collection device.

19. A method of reducing $NO_X$ within a gas stream, said method comprising the steps of:

placing a $NO_X$ reducing catalyst within a flue gas stream; and enhancing the catalyst activity of said $NO_X$ reducing catalyst using a separate catalyst activating source, said $NO_X$ reducing catalyst thereby facilitating removal of $NO_X$ from said flue gas stream;

wherein said enhancing step includes the step of applying a magnetic field to said $NO_X$ reducing catalyst.

20. The method of claim 19 wherein said placing step includes the step of positioning a stationary $NO_X$ reducing catalyst structure into said flue gas stream.

21. The method of claim 19 wherein said placing step includes the step of injecting a $NO_X$ reducing catalyst powder into said flue gas stream.

22. The method of claim 21 further comprising the step of collecting said $NO_X$ reducing catalyst powder in a particulate collection device.

23. The method of claim 12 further comprising the step of activating said $NO_X$ reducing catalyst in said particulate collection device.

* * * * *